United States Patent [19]
Rosen

[11] 3,977,856
[45] Aug. 31, 1976

[54] CLINICAL THERMOMETER OPENING APPARATUS AND METHOD

[75] Inventor: Harvey Rosen, New York, N.Y.

[73] Assignee: Kaye Thermometer Corporation, Brooklyn, N.Y.

[22] Filed: July 7, 1975

[21] Appl. No.: 593,695

[52] U.S. Cl. ................................ 65/29; 65/110; 65/158; 65/161; 65/162; 356/111
[51] Int. Cl.² ................ C03B 23/08; C03B 23/10
[58] Field of Search .............. 65/29, 62, 110, 120, 65/158, 161, 162, 272, 276, 282; 356/102, 103, 111

[56] References Cited
UNITED STATES PATENTS

| | | | |
|---|---|---|---|
| 2,967,450 | 1/1961 | Shields et al. | 356/102 |
| 3,472,638 | 10/1969 | Rosen | 65/29 |
| 3,573,891 | 4/1971 | Ayres | 65/110 |
| 3,709,610 | 1/1973 | Kruegle | 356/111 X |

Primary Examiner—S. Leon Bashore
Assistant Examiner—Richard V. Fisher

[57] ABSTRACT

A method and apparatus for making a controlled opening or bubble in the bore of a glass clinical thermometer comprises directing a narrow light beam at the heated glass while introducing pressurized fluid into the bore. The light beam is chosen to form a diffraction pattern including a sharply imaged area whose width corresponds to the bore diameter. The diffraction image area width is used to obtain the desired bubble dimensions.

12 Claims, 7 Drawing Figures

CLINICAL THERMOMETER OPENING APPARATUS AND METHOD

This invention relates to apparatus and a method for making an opening in the bore of a glass clinical thermometer.

In making a clinical thermometer, it is necessary to form two bubbles in the bore of glass tubing. One, called the "opening," is later cut in half and forms a funnel to allow mercury from a bulb to enter the bore. The other, called the "blister," is later collapsed under heat to form a valve to provide the thermometer maximum reading.

At the present state of the art, pieces of glass tubing long enough to make two thermometers are loaded into holders in an indexing table and flames are directed onto the glass where it is desired to create bubbles; at either end to form one of the two blisters, or at the center to form a common opening. Compressed air is introduced into one end of the tubing to cause expansion of the bore at the heated point. Control of the size of these bubbles is by one of two methods: (1) glass sorting to select glass of same size and bore position; and (2) projection of an image of a bubble with a projecting microsope, and manual turn-off of air pressure by an operator individually for each of the three bubbles based upon the projected bubble image. It is desired to keep the bubbles uniform to simplify later processing, prevent rejects, and make the final product more uniform. The above described methods lead to excessive operator errors and require considerable labor.

A main object of the invention is a new method for making controlled bubbles in glass tubing which does not require subsequent sorting or individual operator judgment.

Another main object of the invention is clinical thermometer opening apparatus capable of forming bubbles of controlled size accurately, reproducibly, and nearly fully automatically.

These and other objects and advantages of the invention as will appear hereinafter are achieved, briefly speaking, by utilizing a light beam to form a diffraction pattern of the tubing bore. I have found that a diffraction pattern of the bore has a characteristic dark area with sharply defined borders whose width is directly proportional to the bubble size. Thus the width can be readily and accurately measured by a photosensor while the bubble is expanding under the applied fluid pressure, and the measured width converted into an electrical signal which by means of analog or digital circuits can be used to control or shut-off automatically the fluid pressure to obtain the bubble size desired.

A preferred embodiment in accordance with the invention will now be described in greater detail with reference to the accompanying drawings, wherein.

Before proceeding with the detailed description, reference is made to my earlier U.S. Pat. No. 3,472,638, which describes an optical method for making collapsed blisters or contractions of controlled size in glass tubing for clinical thermometers. While the method there described permits automation of the blister contraction, attempts to apply it to control bubble expansion for the opening have not proved satisfactory, mainly because the image of the projected bubble was too fuzzy, especially at the edges as the bubble expands. Hence, it is very difficult to accurately control bubble size by the apparatus and method described in my earlier patent.

Figures 1, 2, 3A, 3B:
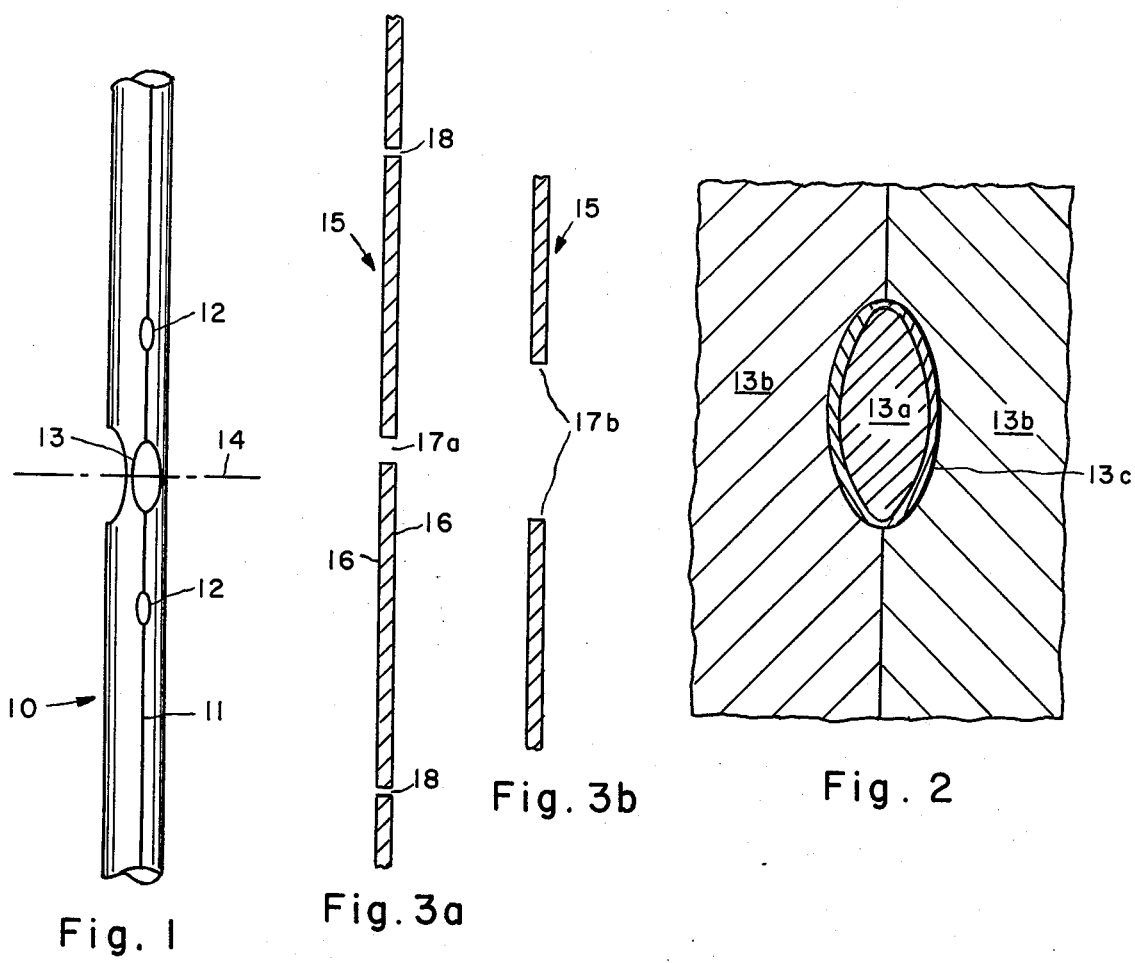
FIG. 1 is a side view of a glass tubing containing several bubbles useful in the manufacture of a glass clinical thermometer.
FIG. 2 illustrates the appearance of the bubble image formed by a projecting microscope.
FIG. 3a illustrates the appearance of the diffraction image formed of the bore before expansion into a bubble in the apparatus of the invention.
FIG. 3b is an illustration similar to FIG. 3a of the bore after the bubble is formed.

Referring now to the drawings, FIG. 1 is a side view of the glass tubing earlier described for the manufacture of two clinical thermometers. The glass tubing is designated 10, and its bore 11, which is very fine, is shown by a single line. Also shown are the two blisters 12 and the larger opening 13 which are to be formed in the bore. After such formation, the tubing is cut along a plane designated by dashed line 14, and then the two halves further processed as described by adding mercury, sealing, collapsing the blister 12, calibrating, and adding a temperature scale.

A microscope projection of the bore opening 13 appears as shown in FIG. 2. Both the interior 13a of the opening, and the surrounding exterior 13b of the bulb appear grey in appearance. The bubble outline 13c is not well-defined and appears as a fuzzy grey-to-dark outline. When such an image is projected onto a photosensor as described in my earlier patent, the electrical output does not vary in relation to the size of the outline 13c, let alone in a linear relationship to the outline size, the importance of which will appear hereinafter.

A feature of the present invention is to form a diffraction pattern of the tubing bore, which is illustrated in FIGS. 3a and 3b. FIG. 3a shows the diffraction pattern of the unexpanded bore 13. As will be observed, a light band 15 with well defined edges 16 is formed. There is a main dark spot 17a, again with well-defined edges, also formed. This corresponds to the first-order reflection of the bore diameter. Smaller, secondary dark spots 18 are also formed resulting from higher-order reflections, but these are cut-off and not imaged on the photosensor. FIG. 3b illustrates the diffraction pattern formed of the expanded opening which is imaged on the photosensor. The main dark spot 17b has widened. The width of the dark spot 17b is found to be directly proportional to the size of the opening 13. Thus, when the two diffraction patterns are imaged onto a photosensor, the electrical output, in turn, from the photosensor is linearly related to the opening or bubble size 13. Thus, that electrical output is readily utilized, by analog or digital circuitry, to control the applied fluid pressure causing the bubble expansion.

A preferred embodiment of the apparatus of the invention employs an automatically indexing table well known in this field. Thus, only schematic views have been employed in the drawings as the construction is well-known. The novel elements are mainly in the light source used, and the electronic circuitry.

Figure 4:
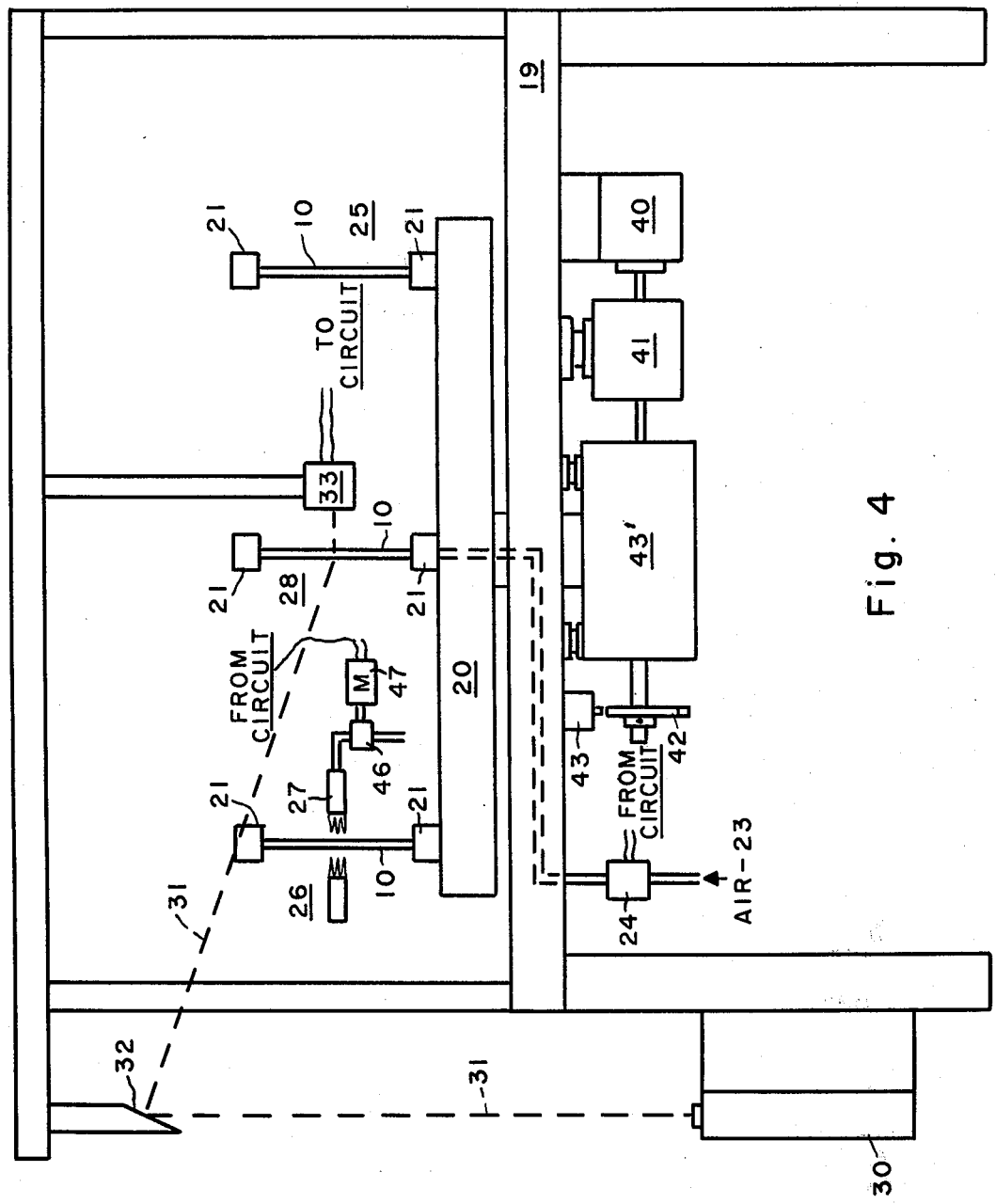
FIG. 4 is a schematic view of one form of apparatus in accordance with the invention.

FIG. 4 is a schematic side view of the preferred embodiment showing an indexing rotatable table 20 mounted on a support 19 and provided with suitable holders 21 for receiving and supporting vertically the glass tubing 10 in which the bubbles are to be formed. When the table 20 indexes to a measuring station a source 23 of pressurized fluid, such as compressed air, is connected to one of the holders 21 whereby air under pressure can be directed into the glass bore under control of a suitable valve 24. Only a few stations are shown schematically; a first station 25 where the tubing is loaded by the operator, a second heating station 26 where flames from burners 27 are directed at the tubing wall to heat the glass to its softening or flow temperature, and a third measuring station 28 wherein air pressure is applied to the bore to form a bubble at the heated area while a diffraction image of the bore is projected onto a photosensor. Any suitable means may be provided for forming a narrow light beam capable of providing a diffraction pattern of the bore on a photosensor.

FIG. 4 shows a preferred method wherein a light source 30 is mounted on the turntable support 19, and a beam 31, after reflection from a mirror 32, is directed onto the bore in such manner as to form a diffraction pattern on the photosensitive surface of a suitable photosensor 33. I prefer to use a laser as the light source 30, since it readily generates a narrow, well collimated light beam. However, any narrow, collimated light source can be used in place of the laser. Also, a narrow slit image from a non-collimated point source can also be used. All that is required is that the light beam forms a diffraction pattern of the bore. FIG. 4 also shows, schematically, the driving means for indexing the table, comprising a motor 40 and gear reducer 41 and a cam 42 rotated by suitable gearing 43' by the motor 40 and having a cam profile adapted to activate a microswitch 43 whenever a heated tubing is indexed to the third station 28 for expansion of the bore to form the bubble. The fuel supply for the burners 27 passes through a valve 46 to which a motor 47 is connected for controlling the valve position and thus the size of the flames.

The output from the photosensor, which may be, for example, a photocell or photodiode, may take various forms. In the simplest case, the output is a voltage whose magnitude decreases as the bubble size increases, as a result of increasing the dark spot size 17b which reduces the amount of light impinging on the sensor. In the apparatus of the invention, the output voltage is linearly related to the bubble size. Thus analog circuitry can be employed to utilize the sensor output voltage to control the size of the bubble formed.

Figure 5:
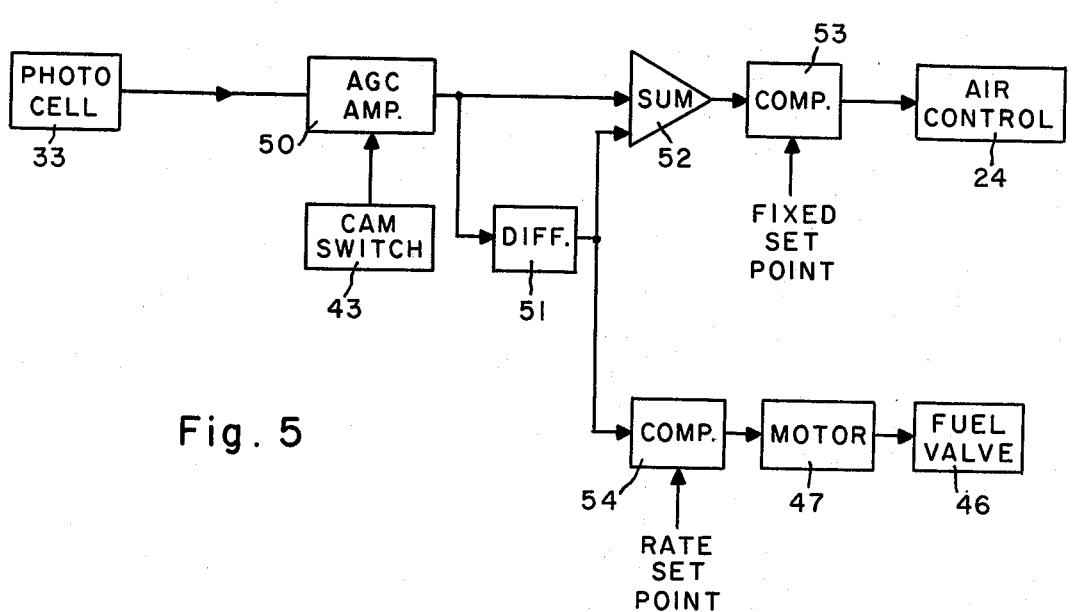
FIG. 5 is a block diagram of one form of analog circuitry for use with the apparatus of FIG. 4.

A block diagram of suitable analog circuitry is illustrated the FIG. 5. The photosensor 33, which may be a photocell, is shown at the left. Its output is connected to an automatic gain controlled amplifier 50 which has two modes of operation. The first mode is its AGC mode, and the amplifier 50 is operated in this first mode when the glass tubing 10 first comes into the light beam 31 and before expansion of the bubble. Once the gain has been automatically set, the amplifier 50 is then maintained at a fixed gain or constant gain during the remainder of the control cycle while the bubble is expanding. This is its second or fixed gain mode. The result is an electrical output from the amplifier 50 which is proportional to the ratio of light input to sensor from no bubble to full bubble. This manner of operation compensates for such variables as beam source intensity variations, tube light absorption variations of different glass tubes, and alignment errors. The switch from the AGC mode to the fixed gain mode is controlled by an electrical signal from the microswitch 43 actuated by the cam 42.

The output from the amplifier 50 is fed to a differentiator 51, and the output from the latter and that from the amplifier 50 are connected to and summed in a summing amplifier 52. This is done to compensate for the amount the bubble continues to expand after the air-pressure is terminated. That is to say, the air pressure 23 is cut-off by value 24 before the finally desired bubble size is attained, and the bubble size "coasts" to the finally desired value. The summed output from the summing amplifier 52 is fed to a comparator 53 where its value is compared to a fixed set-point inserted by the operator and which has been determined by trial and error will produce the desired bubble size. The output of the comparator 53 is then used to control the air pressure by valve 24. The air pressure control can be controlled by an on-off mode. Thus, when the comparator output is nulled, the valve 24 is actuated to shut-off the air pressure. Alternatively, the air pressure can be controlled in a proportional mode wherein as the comparator output drops as the summed input approaches the fixed set-point, the air pressure is gradually reduced in proportion.

Additional circuitry can also be provided to compensate for long term flame variations which changes the glass softness and could alter the growth rate of the expanding bubble. This is accomplished by feeding the output from the differentiator 51 to a second comparator 54 into which a rate set point is inserted by the operator based upon trial and error. If the rate growth of the dark spot 17b is non-uniform compared with the inserted rate set point, producing an output from the second comparator 54, that output can be used to actuate the motor 47 which actuates fuel valve 46 to enlarge or decrease the fuel supply to the burners 27 to compensate for flame variations to produce a constant growth rate of dark spot increase.

Additional circuitry (not shown) can also be provided in a similar manner to compensate for variations in the bore size. Thus, during the AGC mode, before blow-up of the opening bubble, the width of the original dark spot 17a (FIG. 3a), which corresponds to the bore diameter, is measured. The measured value can then be compared with a fixed set-point in a comparator, and the comparator output then used to vary the fixed set point inserted into the first comparator 53 which controls the bubble size obtained. Thus, when the bore size is larger than the average, the opening size, which forms part of the thermometer bulb reservoir, can be correspondingly increased and vice-versa. This would allow the use of more uniform scale lengths in the finished thermometer.

Figure 6:
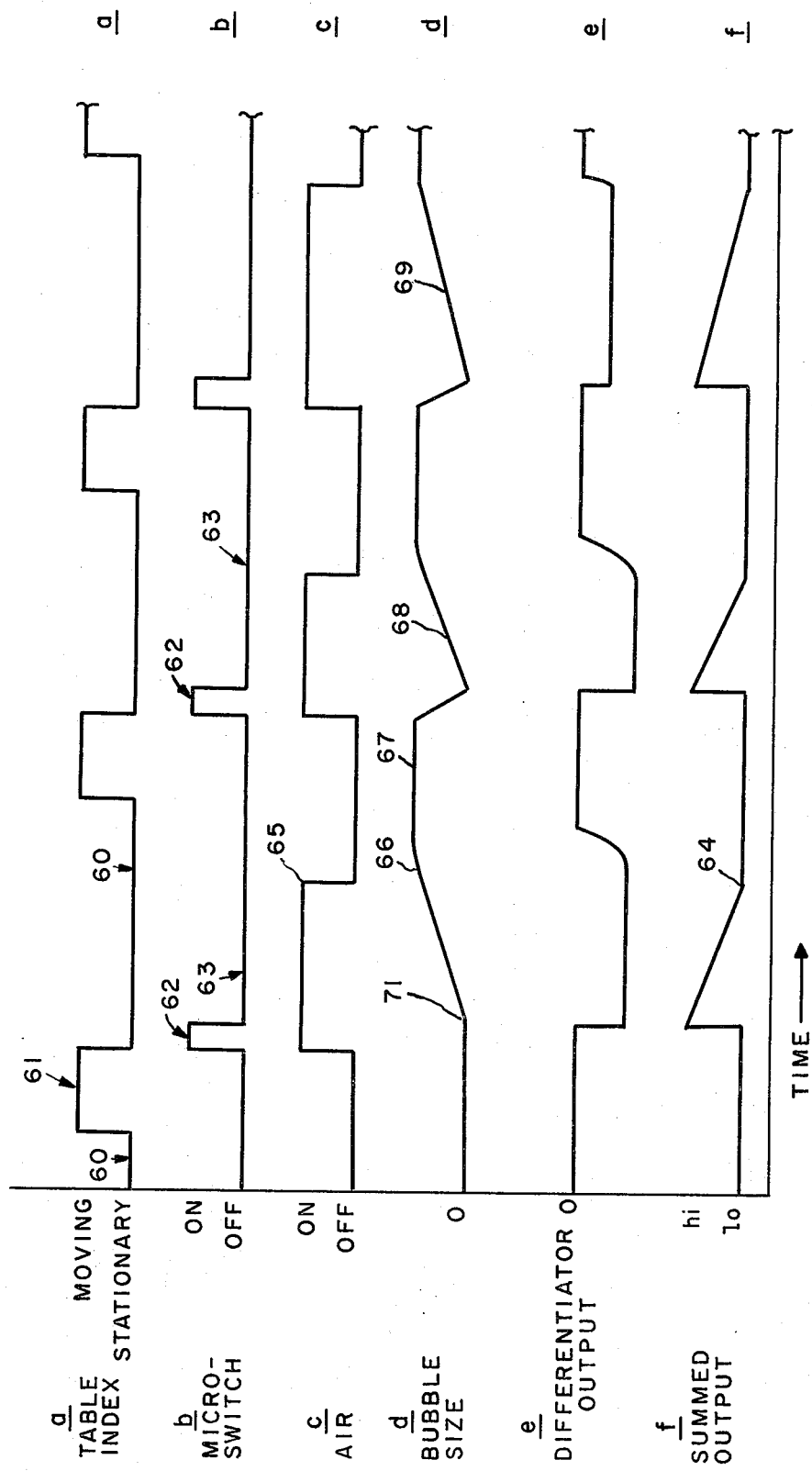
FIG. 6 shows a time diagram with several waveforms to illustrate operation of the apparatus of FIGS. 4 and 5.

FIG. 6 is a timing diagram which will aid in understanding operation of the system illustrated in FIGS. 4 and 5. The top curve a shows the movement of the indexing table 20. At the times indicated by 60, the glass tubing is at the second station 26 being heated. During the time interval indicated by 61, the table indexes carrying the heated tubing to the third station 28. Curve b indicates operation of the microswitch 43 by the cam 42. Curve c indicates operation of the air pressure in an on-off mode. Curve d shows the blister size, and curve e the differentiator 51 output. The output of the summer 52 is shown in curve f.

When the table 20 becomes stationary with the heated bulb at station 28 where the beam 31 impinges on tubing 10 forming the diffraction image on sensor 33, the air pressure is turned on and the AGC amplifier switched into its AGC mode indicated at 62 for a very short time to establish the desired gain before the bubble begins expanding (see curve d). Then the cam 42 actuates the microswitch 43, shown at 63, switching the amplifier 50 into its constant gain mode. Now, the bubble size begins to expand, shown at 71 in curve d. The amplifier 50 output will decrease correspondingly, as will the summer output shown at curve f. When the summer nulls at point 64, the air pressure is shut-off, shown at 65. The blister size then "coasts" 66 to the finally desired size 67. The table next indexes bringing a freshly heated tubing to the measuring station 28, and the cycle is repeated. The succeeding waveforms illustrate performance with a tubing whose bubble size, shown at 68, increases at a faster rate than before, and the corresponding changes in the differentiator 51 and summer 52 outputs which will result in the air pressure being shut-off at an earlier time. The final cycle illustrated is with a tubing whose bubble size, shown at 69, expands at a slower rate, with the result that little "coasting" occurs and the air pressure is shut-off at a point just before the finally desired size is obtained.

The invention is not limited to the use of analog or hard-wired circuitry. As is well known in the circuit art, the analog signal can be converted into a digital signal and processed with appropriate digital circuitry to achieve the objectives described above.

One way of accomplishing this is to use a microprocessor of the type commercially available. Essentially it would be programmed as follows, using a sensor to determine whether the cam switch is on or off, an analog-digital converter (ADC) to convert the photocell output to digital form, and suitable circuitry to convert the fixed set point for the comparator 53 to digital form which is stored in the microprocessor.

First the microprocessor follows a loop continually sensing the microswitch condition until it turns on (62 in FIG. 6b). Next, it reads the unexpanded bore size, computes a fixed set point to achieve the desired bubble size, and stores the computed value. Then it furnishes a signal to turn-on the air pressure. Then it loops until it senses the cam switch off (63 in FIG. 6b). Then after a first preset delay it reads and stores a first expanded bubble size, and after a second preset delay reads and stores a second expanded bubble size. The difference between the first and second bubble sizes is calculated and used along with the stored fixed set point to calculate a new variable set point. If the computation indicates the proper bubble size has not been obtained, and the cam switch is still off, after another delay the expanded bubble size is read a third time, compared with the stored first bubble size, and so on, until the desired comparison has been reached, whereupon the air supply is shut-off and the microprocessor returned to its initial standby position. Should the cam-actuated microswitch become turned-on before the correct value is obtained, then the tubing is rejected and the microprocessor continues into a new cycle with a freshly positioned tubing.

Instead of a photocell, a photodiode array can be used as the photosensor to produce a digital signal directly. Each of the diodes would be programmed to have an on-off threshold based on the average output of the diodes with the greatest and least illumination. Thus, the number of diodes on would be related to the amount of light impinging on the diode array, and counting the number of on-diodes would give a digital number directly.

All of the electrical circuit components above described are conventional and readily obtained from commercial sources.

As mentioned above, the laser can be replaced with a small optical system which projects a narrow line of light at a distance of about one inch. Such an optical system can consist of a small light bulb, a narrow slit, and lenses to project the slit image onto the glass tubing. If desired, the optical system and photosensor can be combined in a single housing which is moved into a position adjacent the glass tubing at measuring station 28.

The above-described system illustrates how one bubble of controlled size can be formed in the glass tubing. If more than one bubble is to be formed, then the machine can be provided with additional heating and measuring stations for each additional bubble to be formed. All the controls and circuitry would be duplicated for each bubble to be formed. The invention is not limited just to the manufacture of the thermometer opening, but can also be used to form blisters of controlled size in the glass tubing, to be subsequently collapsed to form the maximum reading valve.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A method for making an opening in the bore of a glass tubing portion in the manufacture of a glass clinical thermometer, comprising the steps of directing a narrow light beam at the glass tubing portion so as to form on the sensitive surface of a photosensor a diffraction image of the glass tubing bore, thereby producing a certain electrical output from the photosensor, heating the glass tubing portion to soften the glass, establishing fluid pressure in the tubing bore causing the bore to widen at the softened glass and causing a change in the diffraction image formed by the light beam and thus varying the electrical output from the photosensor, and utilizing the varied electrical output to control the fluid pressure to cause the widened bore to assume a desired size.

2. The method of claim 1 wherein the electrical output is also utilized to control heating of the glass tubing.

3. The method of claim 1 wherein the varied electrical output is utilized by producing a differentiated signal, summing the differentiated signal and the electrical output, comparing the summed output with a fixed set point, and controlling the fluid pressure with the comparator output.

4. The method of claim 3 and further including subjecting the photosensor output to constant gain amplification.

5. Apparatus for making a controlled bubble in the bore of glass tubing for use in the manufacture of a glass clinical thermometer, comprising means for supporting glass tubing containing a bore, a photosensor having a sensitive surface, means for forming a diffraction image on the sensitive surface of the photosensor of a portion of the glass tubing bore, thereby producing a certain electrical output from the photosensor, means for heating the glass tubing portion, means for establishing fluid pressure in the bore of the glass tubing, and means responsive to the electrical output from the photosensor for controlling the fluid pressure in the bore to produce a bore bubble of controlled size.

6. Apparatus as claimed in claim 5 wherein the controlling means comprises means for comparing the photosensor electrical output with a preset value, and means operatively connected to the comparing means for shutting-off the fluid pressure when the photosensor electrical output substantially matches the preset value.

7. Apparatus as claimed in claim 6 wherein the shutting-off means are connected to shut-off the fluid pressure before the bubble reaches its finally desired size.

8. Apparatus as claimed in claim 7 wherein the controlling means comprises means for differentiating the photosensor electrical output, means for summing the photosensor electrical output and the output from the differentiating means, and means for connecting the output from the summing means to the comparing means.

9. Apparatus as claimed in claim 8 and further comprising second comparing means connected to the output from the differentiating means, means for inserting a bubble growth rate set point into the second comparator, and means connected to the second comparator for controlling the heating means for the glass tubing.

10. Apparatus as claimed in claim 6 and further including an automatic gain controlled amplifier having an AGC mode and a constant gain mode, means for switching the automatic gain controlled amplifier into the AGC mode when the diffraction image of the glass tubing bore is first formed, and means for switching the automatic gain controlled amplifier into its constant gain mode when the bubble is expanded by the applied fluid pressure.

11. Apparatus as claimed in claim 5 wherein the diffraction image forming means comprises a laser.

12. Apparatus as claimed in claim 5 wherein the diffraction image forming means comprises mean supplying light, a narrow slit, and means for projecting the slit image onto the glass tubing.

* * * * *